(12) United States Patent
Hirsch et al.

(10) Patent No.: US 10,021,736 B2
(45) Date of Patent: Jul. 10, 2018

(54) SKIP RX DURING SBS TRANSMISSION

(71) Applicant: QUALCOMM Incorporated, San Diego, CA (US)

(72) Inventors: Olaf Josef Hirsch, Sunnyvale, CA (US); Guido Robert Frederiks, Watsonville, CA (US); Zhanfeng Jia, Belmont, CA (US); Youhan Kim, Fremont, CA (US); Yixiang Li, Fremont, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 14/696,952

(22) Filed: Apr. 27, 2015

(65) Prior Publication Data

US 2016/0315640 A1 Oct. 27, 2016

(51) Int. Cl.
  *H04W 88/06* (2009.01)
  *H04L 27/00* (2006.01)
  *H04L 5/14* (2006.01)
  *H04L 27/26* (2006.01)
  *H04L 5/00* (2006.01)

(52) U.S. Cl.
  CPC .......... *H04W 88/06* (2013.01); *H04L 5/0073* (2013.01); *H04L 5/143* (2013.01);
  (Continued)

(58) Field of Classification Search
  CPC ... H04B 1/005; H04L 27/0008; H04L 5/0073; H04L 5/143; H04L 27/0014;
  (Continued)

(56) References Cited

U.S. PATENT DOCUMENTS

| 6,405,052 B1 * | 6/2002 | Faber | H04W 52/50 370/252 |
| 7,327,754 B2 * | 2/2008 | Mills | H04L 12/12 370/419 |

(Continued)

FOREIGN PATENT DOCUMENTS

| EP | 1116363 A1 | 7/2001 |
| WO | WO 2011/088468 A1 * | 7/2011 |
| WO | WO-2011088468 A1 | 7/2011 |

OTHER PUBLICATIONS

International Search Report and Written Opinion—PCT/US2016/023971—ISA/EPO—dated Jun. 17, 2016.

*Primary Examiner* — Janice Tieu
(74) *Attorney, Agent, or Firm* — Paradice and LLP/Qualcomm

(57) ABSTRACT

A method and apparatus for concurrent wireless communications on multiple channels of the same frequency band. A wireless device receives a first data signal via a first transceiver chain while concurrently initiating a transmission of a second data signal via a second transceiver chain of the wireless device. The wireless device suspends updates to one or more tracking loops of the first transceiver chain in response to initiating the transmission of the second data signal. The updates to the one or more tracking loops may be suspended prior to transmitting the second set of data from the second transceiver chain. The wireless device may subsequently resume updates to the one or more tracking loops of the first transceiver chain after completing the transmission of the second data signal.

27 Claims, 8 Drawing Sheets

(52) U.S. Cl.
CPC ...... *H04L 27/0008* (2013.01); *H04L 27/0014* (2013.01); *H04L 27/2657* (2013.01); *H04L 27/2662* (2013.01); *H04L 5/001* (2013.01)

(58) Field of Classification Search
CPC . H04L 27/2657; H04L 27/2662; H04L 5/001; H04W 88/06
USPC ........................................................ 375/219
See application file for complete search history.

(56) References Cited

U.S. PATENT DOCUMENTS

| | | | |
|---|---|---|---|
| 2006/0280198 A1* | 12/2006 | Lee ...................... | H04B 1/7085 370/445 |
| 2008/0111599 A1* | 5/2008 | Nair ...................... | H03L 7/0995 327/158 |
| 2008/0247341 A1* | 10/2008 | Lee ...................... | H04N 11/042 370/294 |
| 2008/0287124 A1* | 11/2008 | Karabinis .......... | H04B 7/18536 455/427 |
| 2011/0122972 A1* | 5/2011 | Lie .......................... | H04B 1/28 375/316 |
| 2012/0020310 A1 | 1/2012 | Ji et al. | |
| 2012/0121049 A1 | 5/2012 | Al-Banna | |
| 2012/0294384 A1 | 11/2012 | Wilcoxson et al. | |
| 2013/0242820 A1 | 9/2013 | Choi et al. | |
| 2014/0198872 A1 | 7/2014 | Barriac et al. | |
| 2015/0110058 A1* | 4/2015 | Shapira ................ | H04B 1/3805 370/329 |
| 2016/0323089 A1 | 11/2016 | Hirsch et al. | |

* cited by examiner

SKIP RX DURING SBS TRANSMISSION

TECHNICAL FIELD

The present embodiments relate generally to wireless networks, and specifically to transmitting and receiving wireless signals, concurrently, within the same frequency band.

BACKGROUND OF RELATED ART

Modern wireless devices (e.g., Wi-Fi devices) may be configured to operate in a single-band simultaneous (SBS) mode whereby the wireless device is active on multiple channels, concurrently, in the same frequency band (e.g., 2.4 GHz or 5 GHz band). For example, the wireless device may include a first transceiver chain that operates on one wireless channel (e.g., Channel A) and a second transceiver chain that operates on another wireless channel (e.g., Channel B). Accordingly, the first transceiver chain may transmit data signals via Channel A while the second transceiver chain transmits data signals via Channel B, concurrently. Similarly, the first transceiver chain may receive data signals via Channel A while the second transceiver chain receives data signals via Channel B, concurrently.

Challenges may arise when one of the transceiver chains attempts to transmit data signals on one channel while the other transceiver chain is receiving data signals on another channel. For example, if the first transceiver chain transmits an outgoing data signal while the second transceiver chain is receiving an incoming data signal, the transmission of the outgoing data signal may interfere with the reception of the incoming data signal. This phenomenon, commonly known as "self-interference," typically occurs when the first and second transceiver chains are located in relatively close proximity of one another. Due to the close proximity of the transceiver chains, the signal strength of the outgoing data signal may be significantly greater than the signal strength of the incoming data signal (e.g., as viewed by a receive chain of the second transceiver chain). As a result, the second transceiver chain may not only fail to receive incoming data signals that directly overlap with the outgoing data signal, but may also fail to receive incoming data signals that arrive after transmission of the outgoing data signals ends.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for concurrent wireless communications on multiple channels of the same frequency band are disclosed. For an example embodiment, a wireless device receives a first data signal via a first transceiver chain while concurrently initiating a transmission of a second data signal via a second transceiver chain. Upon initiating the transmission of the second data signal, the wireless device suspends updates to one or more tracking loops of the first transceiver chain. The updates to the one or more tracking loops may be suspended prior to transmitting the second data signals from the second transceiver chain.

The one or more tracking loops may be used in recovering a set of data from the received first data signal. Further, the updates to the one or more tracking loops may be based at least in part on the received first data signal. For example, the one or more tracking loops may include a delay-locked loop (DLL) circuit. Alternatively, and/or in addition, the one or more tracking loops may include a phase-locked loop (PLL) circuit. The wireless device may subsequently resume updates to the one or more tracking loops of the first transceiver chain after completing the transmission of the second data signal.

The first data signal may be received on a first wireless channel of a first frequency band and the second data signal may be transmitted on a second wireless channel of the first frequency band. In an example embodiment, the first data signal may be received in accordance with a first wireless protocol and the second data signal may be transmitted in accordance with a second wireless protocol that is different than the first wireless protocol. For one example, the first wireless protocol may be a wireless local area network (WLAN) protocol and the second wireless protocol may be a Bluetooth® protocol. For another example, the first wireless protocol may be a Bluetooth® protocol and the second wireless protocol may be a WLAN protocol.

The example embodiments allow a wireless communications device to transmit and receive wireless data signals on two or more channels of the same frequency band, concurrently, while mitigating the effects of self-interference. For example, by suspending updates to one or more tracking loops of a first transceiver chain while a second transceiver chain transmits outgoing data signals, the tracking loops may remain unaffected by self-interference caused by the transmission of outgoing data signals. The tracking loops may immediately resume tracking incoming data signals once the transmission of outgoing data signals is completed.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The example embodiments are described below in the context of Wi-Fi enabled devices for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "wireless local area network (WLAN)" and "Wi-Fi" can include communications governed by the IEEE 802.11 standards, Bluetooth®, HiperLAN (a set of wireless standards, comparable to the IEEE 802.11 standards, used primarily in Europe), and other technologies used in wireless communications. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. Embodiments of this disclosure are not to be construed as limited to specific examples described herein but rather to include within their scope all embodiments defined by the appended claims.

Figure 1:
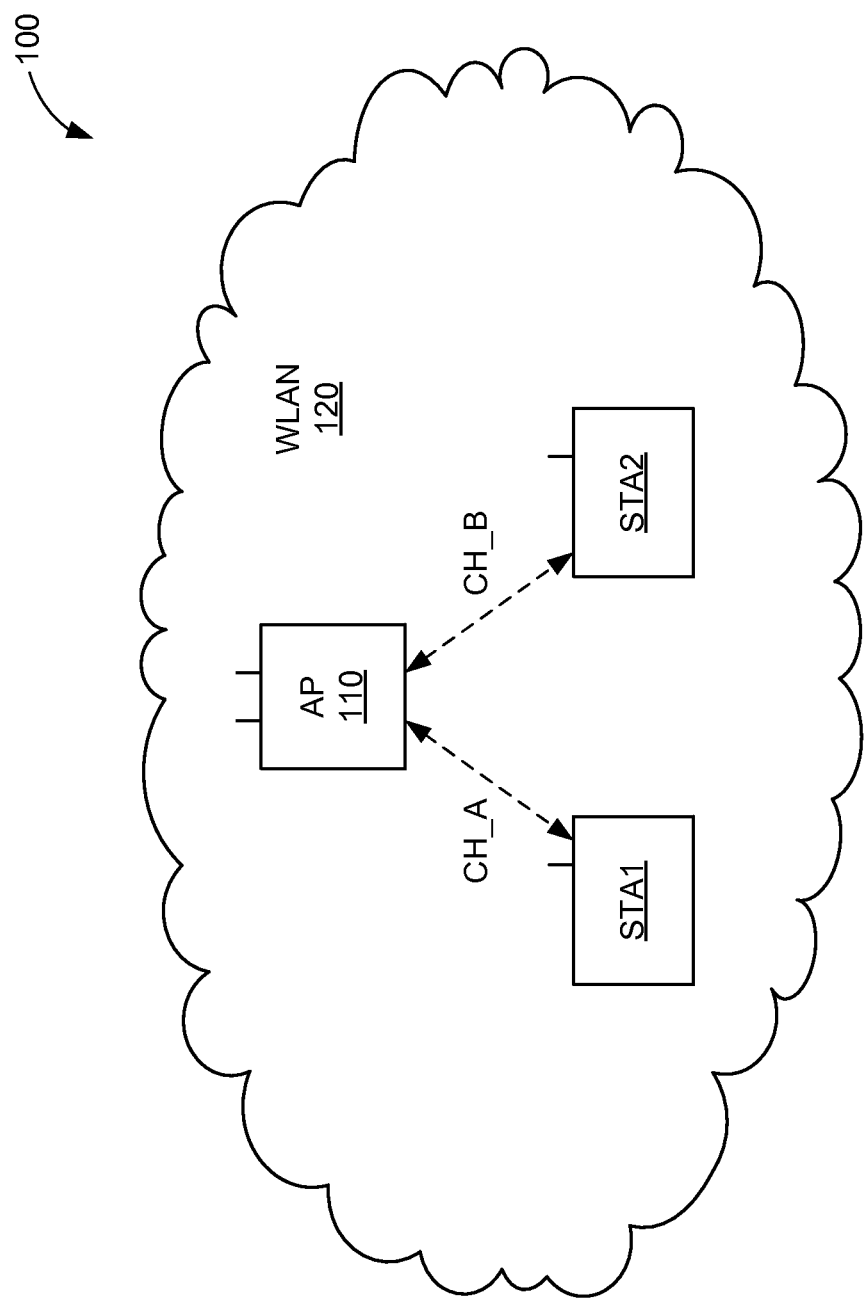
FIG. 1 shows an example wireless system within which the example embodiments may be implemented.

FIG. 1 shows an example wireless system 100 within which the example embodiments may be implemented. The wireless system 100 is shown to include two wireless stations STA1 and STA2, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of STA1 and STA2 is also assigned a unique MAC address.

Each of the stations STA1 and STA2 may be any suitable Wi-Fi enabled wireless device including, for example, a cell phone, personal digital assistant (PDA), tablet device, laptop computer, or the like. Each station (STA) may also be referred to as user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that store instructions for performing operations described below with respect to FIGS. 7 and 8.

The one or more transceivers may include Wi-Fi transceivers, Bluetooth® transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communications protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the $3^{rd}$ Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within stations STA1 and STA2 may be any technically feasible transceiver such as a ZigBee transceiver described by the ZigBee specification, a Wi-Gig transceiver, and/or a HomePlug transceiver described by a specification from the HomePlug Alliance. In example embodiments, two or more transceivers of the same station may communicate within the same frequency band, simultaneously (e.g., with each transceiver operating on a different channel of the frequency band).

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth®, or any other suitable wireless communication standards. For at least one embodiment, the AP 110 may include one or more transceivers, a network interface, one or more processing resources, and one or more memory resources. The one or more transceivers may include Wi-Fi transceivers, Bluetooth® transceivers, cellular transceivers, and/or other suitable RF transceivers (not shown for simplicity) to transmit and receive wireless communication signals. Each transceiver may communicate with other wireless devices in distinct operating frequency bands and/or using distinct communication protocols. In example embodiments, two or more transceivers of the AP 110 may communicate within the same frequency band, simultaneously (e.g., with each transceiver operating on a different channel of the frequency band). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 7 and 8.

In example embodiments, the AP 110 may be configured to communicate with both of the stations STA1 and STA2, concurrently, in the same frequency band. This mode of operation may be referred to herein as "single-band simultaneous" (SBS). For example, the AP 110 may include multiple transceivers or transceiver chains (not shown for simplicity) that operate on (e.g., communicate over) different channels of the same frequency band. Thus, for example, one of the transceiver chains may communicate with STA1 over a first wireless channel (CH_A) and another one of the transceiver chains may communicate with STA2 over a second wireless channel (CH_B). Specifically, the AP's transceiver chains may operate on non-overlapping channels of the frequency band. For example, if channel CH_A corresponds to channel 1 of the 2.4 GHz frequency band, then channel CH_B may correspond to any of channels 6-11 of the 2.4 GHz frequency band (e.g., because for the 2.4 GHz frequency band, channels 6-11 do not overlap channel 1).

When operating in SBS mode, the AP 110 may transmit data signals to both of the stations STA1 and STA2, concurrently, with little or no interference between the channels (e.g., especially when the signals are transmitted to STA1 and STA2 on non-overlapping channels). The AP 110 may also receive data signals from both of the stations STA1 and STA2, concurrently, with little or no interference between the channels. However, complications may arise when the AP 110 attempts to transmit a data signal over one channel while concurrently receiving a data signal over the other channel. For example, as perceived by the AP 110, outgoing data signals transmitted by one of its transceiver chains may be much stronger than incoming data signals received by another of its transceiver chains (e.g., which are generally weakened due to path loss). As a result, the transceiver chain receiving the incoming data signals may undesirably sample and/or "track" (e.g., by adjusting the phase, frequency, delay, and/or other timing information used in the reception of incoming data signals) at least a portion of the outgoing data signals being transmitted by the other transceiver chain.

For example, the AP 110 may track a channel using pilot tones in each received data symbol. The AP 110 may calculate a frequency offset based on the received data signals and the pilot tones. The AP 110 may also estimate a phase offset corresponding with a change in phase of the received data signals. The AP 110 may then use the phase offset and/or frequency offset to correct the received data tones in one or more tracking loops (e.g., DLLs, PLLs, and/or other components that may track the incoming data signal). However, the calculated phase and/or frequency offsets may be distorted due to self-interference at the AP 110 (e.g., when the AP 110 attempts to transmit and receive data signals concurrently). As a result, the AP 110 may apply incorrect modifications to the received data signals. Moreover, the tracking loops in the AP 110 may enter an incorrect state, thereby causing subsequent PDUs of the incoming data signals to receive improper modifications even after the AP 110 has completed its transmission on the other wireless channel.

In example embodiments, the AP 110 may prevent a first transceiver chain (e.g., that is receiving an incoming data signal) from tracking outgoing data signals transmitted by a second transceiver chain, for example, by suspending or disabling updates to one or more tracking loops (e.g., DLLs, PLLs, and/or other components that may track the incoming data signal) within the first transceiver chain. This technique may be referred to herein as "receive skipping." For example, upon detecting that at least one of its transceiver chains is about to transmit an outgoing data signal while another of its transceiver chains is receiving an incoming data signal, the AP 110 may suspend updating one or more tracking loops of the receiving transceiver chain prior to the transmission of the outgoing data signal. The AP 110 may then resume updating the tracking loops of the receiving transceiver chain after the transmission of the outgoing data signal is completed. Upon resuming updates, the tracking loops may quickly lock back onto the incoming data signal (e.g., because the tracking loops were not adversely affected by the outgoing data signal).

Figure 2:
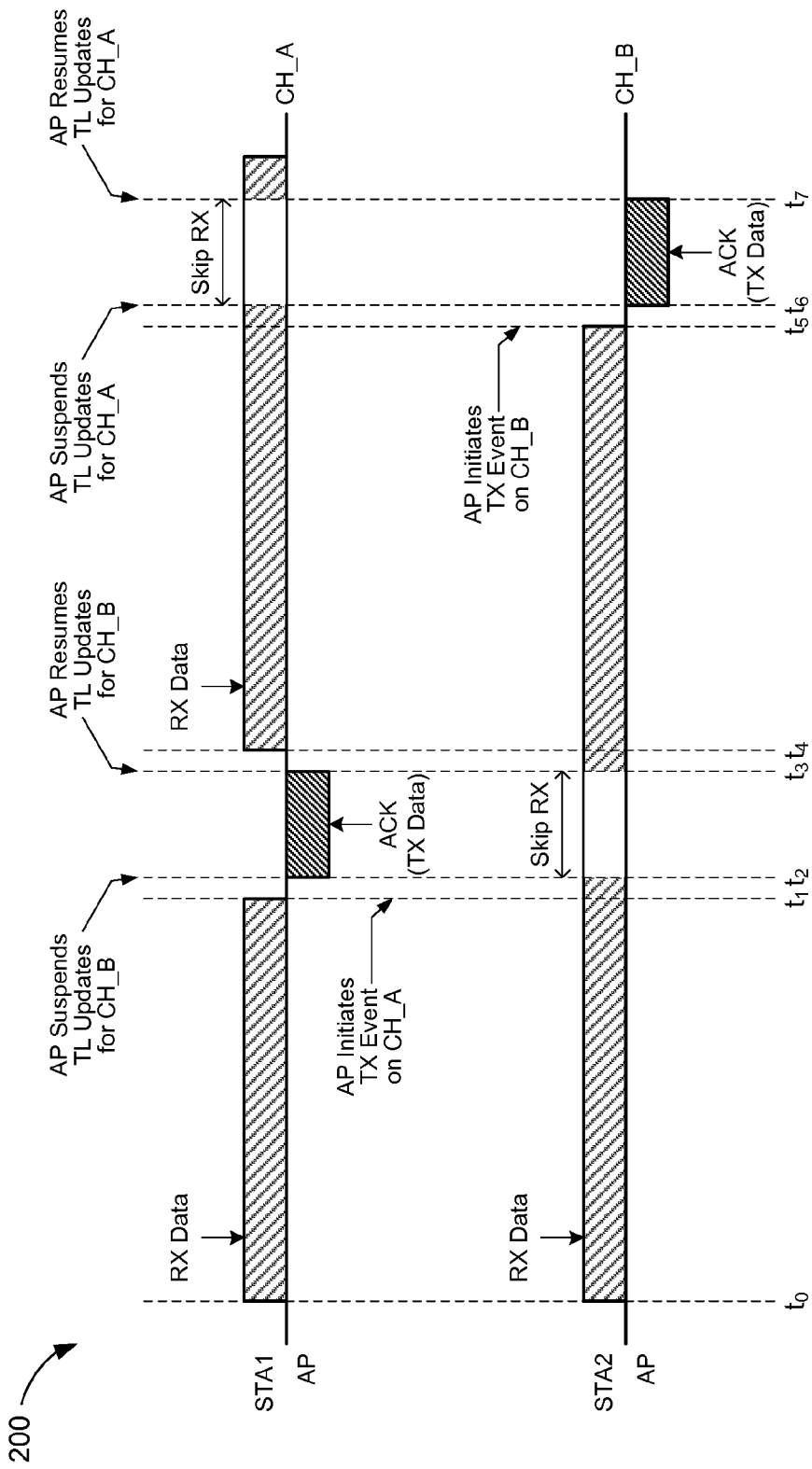
FIG. 2 shows an example timing diagram depicting a single-band simultaneous (SBS) wireless communication with receive (RX) skipping during concurrent transmission and reception of data signals.

FIG. 2 shows an example timing diagram 200 depicting an SBS wireless communication with receive (RX) skipping during concurrent transmission and reception of data signals. For purposes of discussion herein, the AP and stations STA1-STA2 of FIG. 2 may be AP 110 and stations STA1-STA2, respectively, of FIG. 1. At time $t_0$, the AP 110 receives incoming (RX) data signals from both of the stations STA1 and STA2 (e.g., over wireless channels CH_A and CH_B, respectively). For example, the RX data signals may correspond to a number of data frames that each include a number of individual protocol data units (PDUs) (not shown for simplicity). At time $t_1$, the AP 110 stops receiving RX data signals from STA1, and initiates a transmission (TX) event on channel CH_A. For example, time $t_1$ may coincide with the end of a data frame transmitted by STA1 (e.g., for which STA1 expects to receive an acknowledgement (ACK) frame from the AP 110).

Upon initiating the TX event on channel CH_A, the AP 110 suspends tracking loop (TL) updates for its transceiver chain operating on channel CH_B at time $t_2$. At substantially the same time (e.g., time $t_2$), or immediately thereafter, the AP 110 transmits an outgoing (TX) data signal on channel CH_A. For example, the TX data signal may be an ACK frame confirming receipt of data transmitted by STA1. In example embodiments, the tracking loop updates may remain suspended for the duration of the TX data transmission (e.g., from time $t_2$ to $t_3$). Once the AP 110 has finished transmitting the TX data signal on channel CH_A, at time $t_3$, the AP 110 may immediately resume updating the tracking loops of the transceiver chain operating on channel CH_B. Accordingly, the AP 110 may "skip" receiving a portion of the RX data signals on channel CH_B (e.g., which may include one or more PDUs) that overlaps with the TX data signal transmitted on channel CH_A (e.g., from time $t_2$ to time $t_3$), for example, because the overlapping portion is likely to be altered or otherwise affected by the TX data signal.

At time $t_4$, the AP 110 once again begins receiving RX data signals from STA1. Then, at time $t_5$, the AP 110 stops receiving RX data signals from STA2, and initiates a TX event on channel CH_B. Upon initiating the TX event on channel CH_B, the AP 110 suspends tracking loop updates for its transceiver chain operating on channel CH_A at time $t_6$. At substantially the same time (e.g., time $t_6$), or immediately thereafter, the AP 110 transmits a TX data signal on channel CH_B. For example, the TX data signal may be an ACK frame confirming receipt data transmitted by STA2. As described above, the tracking loop updates may remain suspended for the duration of the TX data transmission (e.g., from time $t_6$ to time $t_7$). Once the AP 110 has finished transmitting the TX data signal on channel CH_B, at time $t_7$, the AP 110 may immediately resume updating the tracking loops of its transceiver chain operating on channel CH_A.

In the example embodiments, SBS communications are performed by the AP 110 with respect to multiple STAs. However, in other embodiments, any of the stations STA1 and/or STA2 may be operable in an SBS mode, whereby the STA may communicate with multiple APs and/or other STAs, simultaneously, within the same frequency band. Still further, for some embodiments, a wireless device (e.g., an AP or a STA) may be enabled for SBS communications with just one other wireless device. For example, when operating in an SBS mode, two wireless devices may be enabled for full duplex communications with one another (e.g., for peer-to-peer communications).

Figure 3:
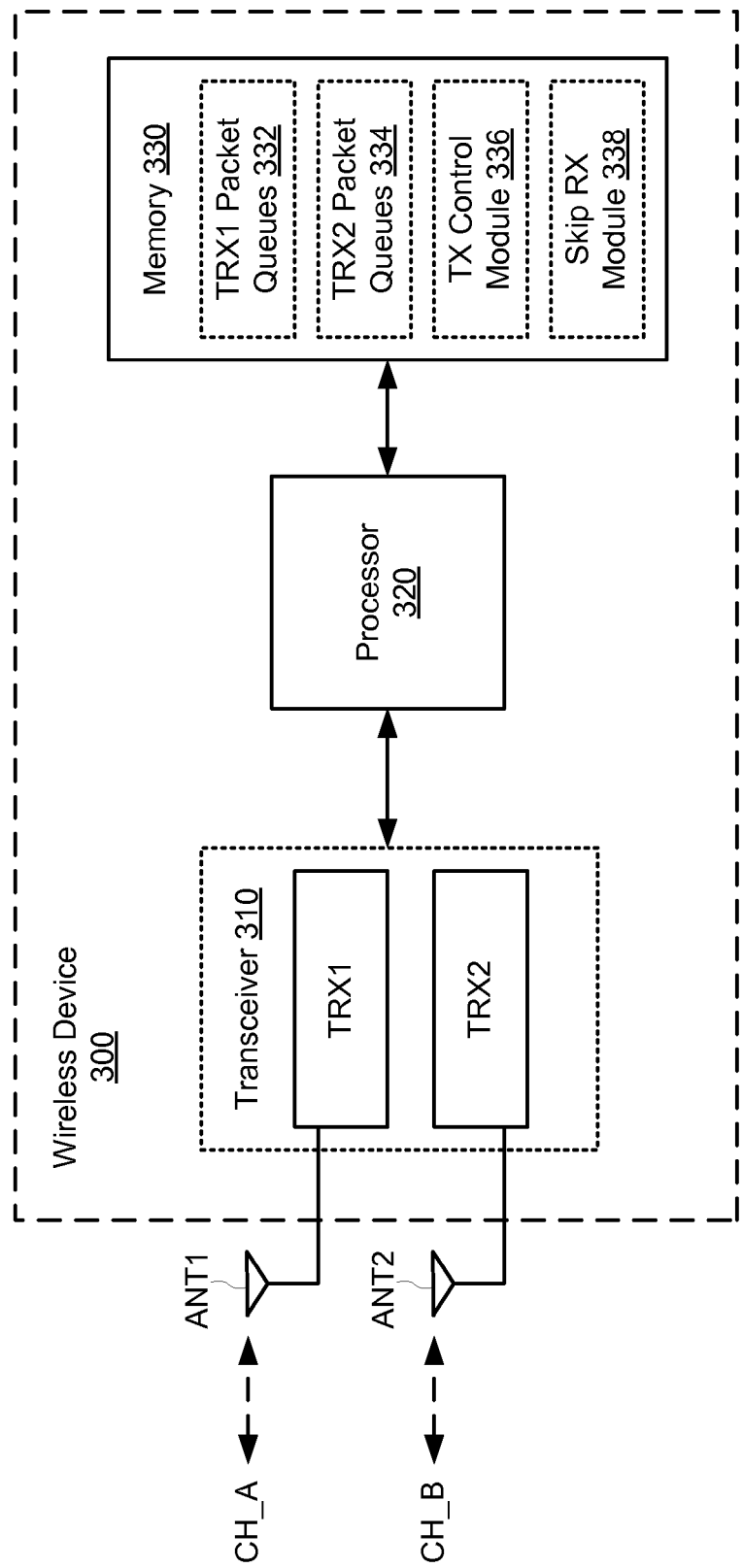
FIG. 3 shows a wireless device in accordance with example embodiments.

FIG. 3 shows a wireless device 300 in accordance with example embodiments. The wireless device 300 may be one embodiment of the AP 110 and/or any of the stations STA1-STA2 of FIG. 1. The wireless device 300 includes at least a transceiver 310, a processor 320, a memory 330, a first antenna ANT1, and a second antenna ANT2. The transceiver 310 may be coupled to antennas ANT1-ANT2 either directly or through an antenna selection circuit (not shown for simplicity). The transceiver 310 may be used to transmit signals to and receive signals from access points, STAs, and/or other suitable wireless devices. The transceiver 310 may also be used to scan the surrounding environment to detect and identify nearby access points and/or STAs.

For the example embodiment of FIG. 3, the transceiver 310 is shown to include two transceiver chains TRX1 and TRX2 that may be used to communicate wirelessly with other suitable wireless devices (e.g., including wireless access points and/or wireless stations). Although not shown in FIG. 3 for simplicity, the first transceiver chain TRX1 may include a first transmit chain to process and transmit signals to another wireless device via antenna ANT1, and may include a first receive chain to process signals received via antenna ANT1. Similarly, the second transceiver chain TRX2 may include a second transmit chain to process and transmit signals to another wireless device via antenna ANT2, and may include a second receive chain to process signals received via antenna ANT2. In example embodiments, each of the transceiver chains TRX1 and TRX2 may be configured to operate on a different channel of a given frequency band (e.g., in SBS mode). For example, the transceiver chains TRX1 and TRX2 may be configured to transmit and/or receive data signals over respective channels CH_A and CH_B of the same frequency band.

Transceiver 310 is depicted in FIG. 3 as including only two transceiver chains TRX1 and TRX2 and two antennas ANT1-ANT2 for simplicity only; for other embodiments, transceiver 310 may include any suitable number of transceiver chains TRX that may be coupled to any suitable number of antennas. Thus, for at least some embodiments, the wireless device 300 may be configured for multiple-input, multiple-output (MIMO) operations. The MIMO operations may include single-user MIMO (SU-MIMO) operations and multi-user MIMO (MU-MIMO) operations.

Processor 320, which is coupled to transceiver 310 and memory 330, may be any suitable one or more processors capable of executing scripts or instructions of one or more software programs stored in the wireless device 300 (e.g., within memory 330). For purposes of discussion herein, processor 320 is shown in FIG. 3 as being coupled between transceiver 310 and memory 330. For actual embodiments, transceiver 310, processor 320, and/or memory 330 may be connected together using one or more buses (not shown for simplicity).

Memory 330 may include TRX1 packet queues 332 and TRX2 packet queues 334. The TRX1 packet queues 332 may store data packets and/or frames to be transmitted from the wireless device 300, via channel CH_A, to one or more receiving devices. The TRX2 packet queues 334 may store data packets and/or frames to be transmitted from the wireless device 300, via channel CH_B, to one or more receiving devices.

Memory 330 may also include a non-transitory computer-readable medium (e.g., one or more non-volatile memory elements, such as EPROM, EEPROM, Flash memory, a hard drive, etc.) that may store the following software modules:
- a transmission (TX) control module 336 to detect and/or monitor transmission events initiated by the wireless device 300 when operating in SBS mode; and
- a skip receive (RX) module 338 to suspend updates to one or more tracking loops in one or more transceiver chains of the transceiver 310 upon detecting a transmission event while operating in the SBS mode.

Each software module includes instructions that, when executed by processor 320, causes the wireless device 300 to perform the corresponding functions. The non-transitory computer-readable medium of memory 330 thus includes instructions for performing all or a portion of the operations described below with respect to FIGS. 7 and 8. For example, processor 320 may execute the TX control module 336 to detect and/or monitor transmission events initiated by the wireless device 300 when operating in SBS mode. Processor 320 may also execute the skip RX module 338 to suspend updates to one or more tracking loops in one or more transceiver chains of the transceiver 310 upon detecting a transmission event while operating in the SBS mode.

Figure 4:
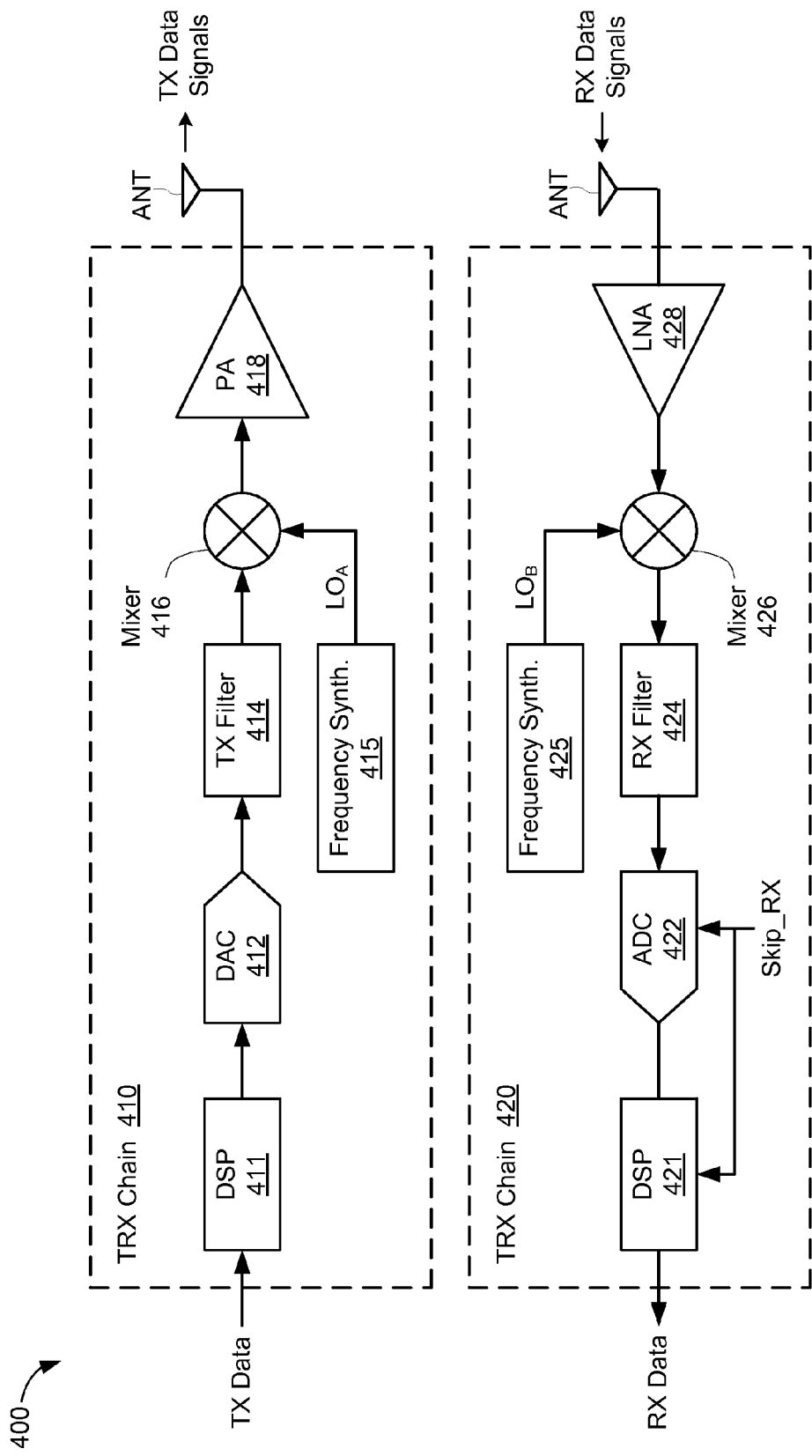
FIG. 4 shows an example transceiver (TRX) circuit that may be operable for SBS wireless communications.

FIG. 4 shows an example transceiver (TRX) circuit 400 that may be operable for SBS wireless communications. The TRX circuit 400 may be implemented by a wireless device (e.g., such as the AP 110 and/or stations STA1 and STA2) to transmit and receive data signals over a wireless medium. For example, the TRX circuit 400 may be one embodiment of the transceiver 310 of FIG. 3. The TRX circuit 400 includes at least two TRX chains 410 and 420. Although only the transmit (TX) circuitry (e.g., elements 411-418) of TRX chain 410 is shown in the example of FIG. 4, the TRX chain 410 may also include receive (RX) circuitry (not shown for simplicity). Similarly, although only the RX circuitry (e.g., elements 421-428) of TRX chain 420 is shown in the example of FIG. 4, the TRX chain 420 may also include TX circuitry (not shown for simplicity). For some embodiments, the two TRX chains 410 and 420 may reside on separate die and/or integrated circuits (ICs).

The first TRX chain 410 may include a digital signal processing (DSP) circuit 411, a digital-to-analog converter (DAC) 412, a TX filter 414, a frequency synthesizer 415, a mixer 416, and a power amplifier (PA) 418. The TX circuitry 411-418 may be used for transmitting outgoing (TX) data signals to another device (not shown). For example, the DSP circuit 411 may convert a set of TX data to a digital data stream. The DAC 412 may convert the digital data stream to an analog data signal, which is filtered by the TX filter 414. The filtered analog data signal is then up-converted to a carrier frequency by the mixer 416, for example, by mixing the analog data signal with a local oscillator signal ($LO_A$) generated by the frequency synthesizer 415. The up-converted analog signal is amplified by the PA 418 and subsequently transmitted onto the wireless medium via antenna ANT as a TX data signal.

The second TRX chain 420 may include a DSP circuit 421, an analog-to-digital converter (ADC) 422, an RX filter 424, a frequency synthesizer 425, a mixer 426, and a low-noise amplifier (LNA) 428. The RX circuitry 421-428 may be used for receiving incoming (RX) data signals transmitted by another device (not shown). For example, the LNA 428 amplifies a signal (e.g., RX data signal) received by antenna ANT, and forwards the received signal to the mixer 426. The mixer 426 down-converts the RX data signal, for example, by mixing the RX data signal with a local oscillator signal ($LO_B$) generated by the frequency synthesizer 425. The data signal may be filtered by the RX filter 424 and converted to a digital data stream via the ADC 422. The digital data stream may then be processed by the DSP circuit 421 to recover a set of RX data.

Although the DSP circuits 411 and 421 are depicted in the example implementation of FIG. 4 as being included within TRX chains 410 and 420, respectively, for other implementations, the DSP circuits 411 and 421 may be separate from the transceiver circuit 400. Further, for at least some implementations, the DSP circuits 411 and 421 may correspond to a baseband processor (not shown for simplicity) of the wireless device 300 of FIG. 3.

In example embodiments, the TRX circuit 400 may be configured to operate in SBS mode. For example, the first TRX chain 410 may be configured to transmit TX data signals over a first wireless channel (e.g., channel CH_A) while the second TRX chain 420 receives RX data signals over a second wireless channel (e.g., channel CH_B) within the same frequency band. Alternatively, and/or additionally, when operating in SBS mode, the TRX chain 420 may be configured to receive the RX data signals concurrently while a third TRX chain (not shown for simplicity) transmits TX data signals over another wireless channel (e.g., channel CH_C) within the same frequency band.

To prevent transmission of the TX data signals from interfering with reception of the RX data signals, the TRX circuit 400 may suspend updating one or more tracking loops within the second TRX chain 420 when performing concurrent transmit and receive operations. In example embodiments, a processor or controller (not shown for simplicity) within the wireless device and/or within the TRX circuit 400 may monitor outgoing data transmissions by the first TRX chain 410. More specifically, the controller may detect when the first TRX chain 410 becomes active (e.g., indicating the start of a TX event), and may assert a Skip_RX signal upon initiation of the TX event. The Skip_RX signal may be used to suspend updates to one or more tracking loops within the DSP circuit 421 and/or the ADC 422 of the second TRX chain 420.

In asynchronous communications, RX data signals are sent without corresponding clock signals. Thus, the ADC 422 may sample the received data signals based on a locally-generated clock signal recovered from the received data signals. The local clock signal may be periodically updated to track the received data signals. In response to the Skip_RX signal, the ADC 422 may suspend updating its local clock signal, for example, to ensure that it does not track a TX data signal being transmitted by the first TRX chain 410. Further, the DSP circuit 421 may include circuitry for filtering, recovering, converting, and/or otherwise processing digital data received via the second TRX chain 420. For example, the DSP circuit 421 may include PLLs, DLLs, and/or other circuitry (not shown in FIG. 4) that tracks the received data signal. In response to the Skip_RX signal, the DSP circuit 421 may also suspend updating any tracking loops that track or otherwise depend upon the received data signal.

Figure 5:
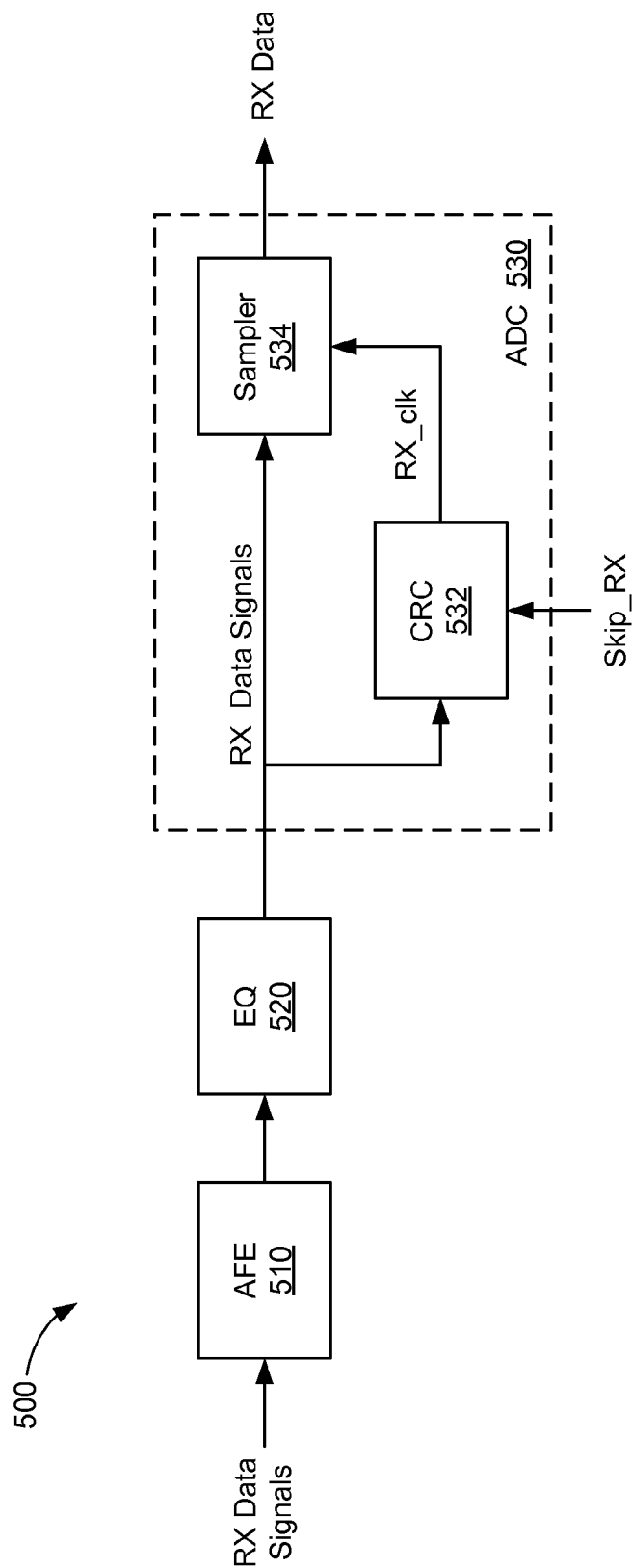
FIG. 5 shows an example receive (RX) chain of a TRX circuit with RX skipping functionality.

FIG. 5 shows an example TRX chain 500 with RX skipping functionality. For example, the TRX chain 500 may be one embodiment of the second TRX chain 420 of FIG. 4. The TRX chain 500 includes an analog front end (AFE) 510, an equalizer (EQ) 520, and an ADC 530. The AFE 510 may include circuitry (e.g., the RX filter 424, mixer 426, and/or LNA 428 of FIG. 4) for receiving RX data signals from another wireless device (not shown for simplicity). The equalizer 520 mitigates (e.g., reduces and/or eliminates) intersymbol interference (ISI) in the RX data signals, and the ADC 530 converts the RX data signals from the analog domain to the digital domain.

The ADC 530 may include a clock recovery circuit (CRC) 532 and a sampler 534. The sampler 534 may convert the RX data signals to a digital (RX) data stream by sampling the RX data signals using a local receive clock (RX_clk) signal generated by the CRC 532. The CRC 532 tracks a phase of the RX data signals to ensure that the RX_clk signal is phase-aligned with the RX data signals. More specifically, the CRC 532 may periodically (e.g., continuously) extract phase and/or frequency information from the RX data signals, and may adjust a phase and/or frequency of the RX_clk signal based on the extracted phase and frequency information.

In example embodiments, the CRC 532 may suspend updating the RX_clk signal when the Skip_RX signal is asserted. For example, upon receiving an asserted Skip_RX signal, the CRC 532 may maintain a current state of the RX_clk signal, without adjusting for phase and/or frequency discrepancies in the RX data signals. When the Skip_RX signal is deasserted, the CRC 532 may resume updating the RX_clk signal based on the RX data signals. By suspending updates to the RX_clk signal, the RX_clk signal may remain unaffected by outgoing data signals concurrently transmitted by a transmit chain of the same wireless device (e.g., TRX chain 410 of FIG. 4). Accordingly, the RX_clk signal may quickly re-establish phase and/or frequency alignment with the RX data signal when the Skip_RX signal is deasserted.

Figure 6:
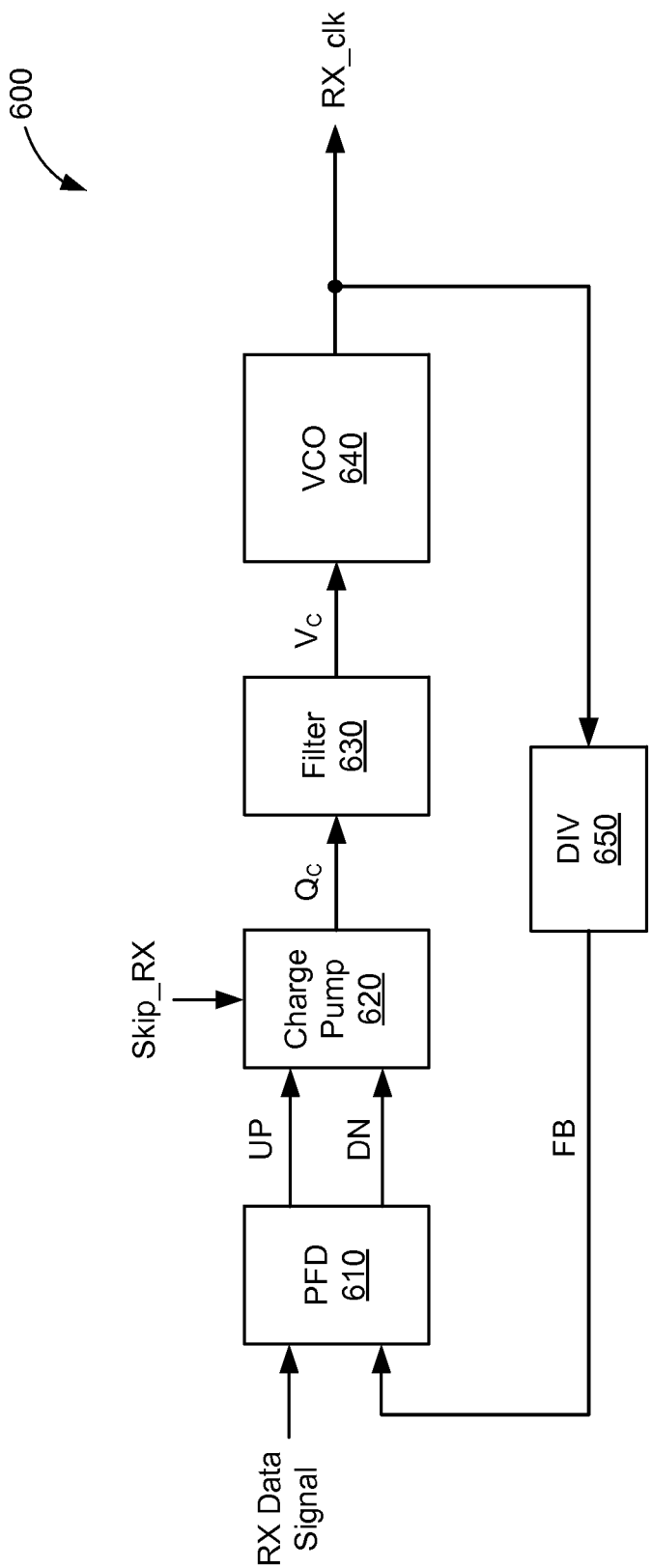
FIG. 6 shows an example clock recovery circuit (CRC) that may suspend updating an output clock signal when operating in an RX skipping mode.

FIG. 6 shows an example CRC 600 that may suspend updating an output clock signal when operating in an RX skipping mode. For example, the CRC 600 may be one embodiment of CRC 532 of FIG. 5. The CRC 600 includes a phase and frequency detector (PFD) 610, a charge pump 620, a loop filter 630, a voltage-controlled oscillator (VCO) 640, and a frequency divider 650. The CRC 600 receives the RX data signals (e.g., as a reference clock signal) and generates the RX_clk signal based on the RX data signals. More specifically, the CRC 600 may periodically adjust a phase and/or frequency of the RX_clk signal based at least in part on detected changes in the phase and/or frequency of the RX data signals. Thus, the RX_clk signal effectively tracks (e.g., is phase-aligned and/or frequency-aligned with) the RX data signal.

For example, the PFD 610 may compare the relative timing (e.g., phase difference) between rising and/or falling edges of the RX data signal and a feedback (FB) signal to generate "up" (UP) and "down" (DN) control signals. The charge pump 620 may convert the UP and DN control signals to a charge ($Q_C$) that is proportional to the phase difference between the RX data and FB signals. The charge $Q_C$ is filtered (e.g., integrated) by the loop filter 630 and provided as a control voltage ($V_C$) to the VCO 640. The VCO 640 generates RX_clk (e.g., as an oscillator signal) having a frequency based on the control voltage $V_C$. The RX_clk signal may be passed through a frequency divider 650 (e.g., to scale the frequency of the RX_clk signal to that of the RX data signal) and provided to the PFD 610 as the FB signal.

In example embodiments, the CRC 600 may suspend updating the RX_clk signal in response to the Skip_RX signal. For example, assertion of the Skip_RX signal may cause the charge pump 620 to hold its present charge $Q_C$. More specifically, the charge pump 620 may stop responding to the UP and DN control signals once it detects that the Skip_RX signal has been asserted. As a result, the control voltage $V_C$ is also held constant, thereby causing the VCO 640 to maintain the RX_clk signal in its current state. This may effectively prevent the RX_clk signal from tracking the RX data signal for the duration that the Skip_RX signal is asserted. Once the Skip_RX signal is deasserted, the charge pump 620 may resume updating its output charge $Q_C$ in response to UP and DN control signals from the PFD 610.

Figure 7:
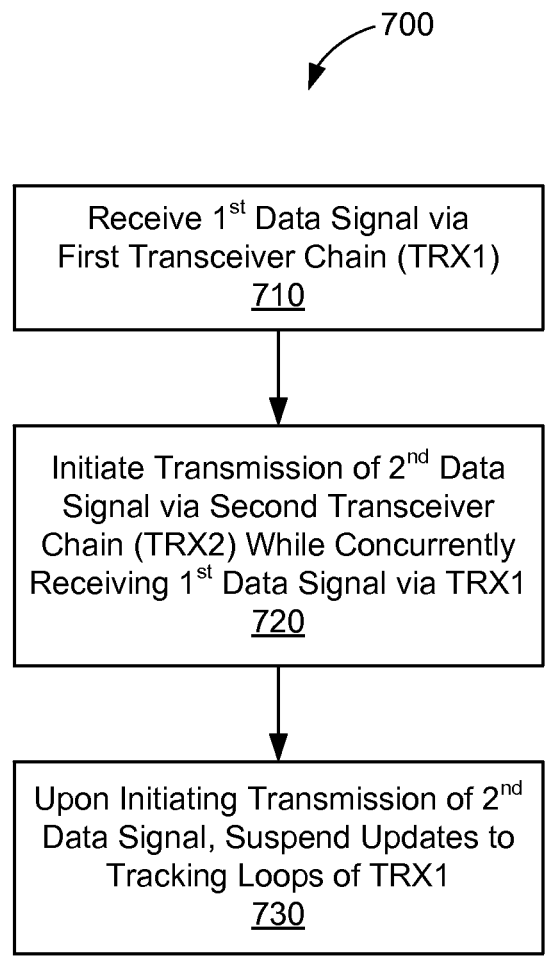
FIG. 7 shows a flowchart depicting an example RX skipping operation.

FIG. 7 shows a flowchart depicting an example RX skipping operation 700. With reference, for example, to FIG. 3, the example operation 700 may be performed by the wireless device 300 to suspend updates to one or more tracking loops of a transceiver (TRX) chain when operating in SBS mode. The wireless device 300 receives a first data signal via a first TRX chain (TRX1) of the transceiver 310 (710). The first data signal may be sent over a particular wireless channel (e.g., CH_A). As described above, the transceiver chains TRX1 and TRX2 may operate on separate wireless channels CH_A and CH_B, respectively.

The wireless device 300 then initiates a transmission of a second data signal via a second TRX chain (TRX2) of the transceiver 310 while concurrently receiving the first data signal via TRX1 (720). Thus, the second data signal may be scheduled to be transmitted over a different wireless channel (e.g., CH_B) than the first data signal. The processor 320, in executing the TX control module 336, may determine that the TX circuitry of the second transceiver chain TRX2 has been activated and/or that a TX event has been initiated on TRX2. For some embodiments, the TX event may correspond with a transmission of buffered TX data from the TRX2 packet queues 334. For other embodiments, the TX event may correspond with a transmission of a management frame (e.g., a beacon frame) or a control frame (e.g., an ACK frame).

Upon initiating the transmission of the second data signal, the wireless device 300 suspends updates to one or more tracking loops of the first transceiver chain TRX1 (730). For example, the TX control module 336 may cause the processor 320 to execute the skip RX module 338 upon determining that the TX circuitry of the second transceiver chain TRX2 has been activated (e.g., is preparing to transmit data signals). The processor 320, in executing the skip RX module 338, may prevent the first transceiver chain TRX1 from updating its tracking loops (e.g., that track the first data signal) until the second transceiver chain TRX2 has finished transmitting the second data signal. In example embodiments, the skip RX module 338, as executed by the processor 320, may assert the Skip_RX signal during transmission of the second data signal. The processor 320, in executing the skip RX module 338, may subsequently allow the first transceiver chain TRX1 to resume updating its tracking loops once the transmission of the second data signal has been completed.

Figure 8:
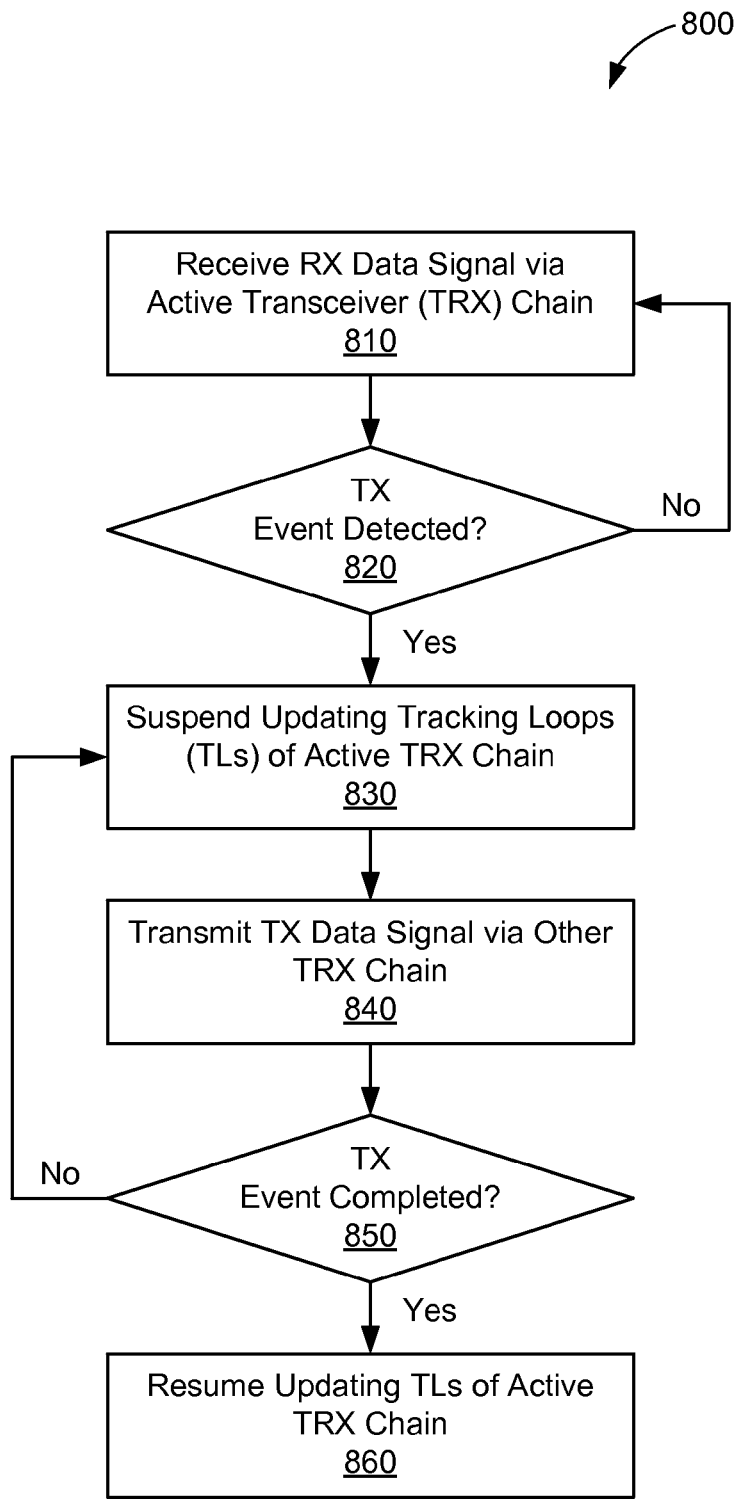
FIG. 8 shows a flowchart depicting an SBS communication operation in accordance with example embodiments.

FIG. 8 shows a flowchart depicting an SBS communication operation 800 in accordance with example embodiments. With reference, for example, to FIG. 4, the operation 800 may be performed by the TRX circuit 400 to transmit and receive data signals, concurrently, in the same frequency band. The TRX circuit 400 receives an incoming (RX) data signal via an active TRX chain (810). In the example of FIG. 4, the active TRX chain may correspond with the second TRX chain 420. In example embodiments, the second TRX chain 420 may operate on a first wireless channel of a particular frequency band.

While receiving the RX data signal, the TRX circuit 400 may monitor for TX events initiated on another TRX chain (820). As described above, a TX event may correspond to a transmission of outgoing (TX) data signals (e.g., which may include buffered data frames, management frames, and/or control frames) via the first TRX chain 410. In example embodiments, the first TRX chain 410 may operate on a second wireless channel of the same frequency band on which the second TRX chain 420 operates (e.g., although the second wireless channel may be different than the first wireless channel). As long as no concurrent TX event is being initiated (as tested at 820), the second TRX chain 420 may continue to receive RX data without interruption (810).

If the TRX circuit 400 detects that a TX event is about to occur on another TRX chain (as tested at 820), the TRX circuit 400 may suspend updating one or more tracking loops of the active TRX chain (830). For example, the TRX circuit 400 may assert the Skip_RX signal to cause the ADC 422 and/or the DSP circuit 421 to hold or otherwise maintain a current state of their tracking loops (e.g., PLLs, DLLs, and/or other circuitry that tracks the RX data signal). After the second TRX chain 420 has suspended updating its tracking loops, the first TRX chain 410 may begin transmitting the TX data signals over the second wireless channel (840). As described above, with respect to FIG. 6, suspending updates to a tracking loop in the second TRX chain 420 may prevent the tracking loop from tracking or locking to a phase and/or frequency of the TX data signals while the Skip_RX signal is asserted.

The TRX circuit 400 may then determine whether the TX event has been completed (850). In some embodiments, the TX event may last a predetermined duration (e.g., the transmission of a fixed-size data frame, management frame, and/or control frame). For other embodiments, the TRX circuit 400 may continue to monitor the first TRX chain 410 to determine when the TX event is over (e.g., when the TRX chain 410 becomes inactive and/or stops transmitting TX data signals). As long as the first TRX chain 410 is still transmitting TX data signals (as tested at 850), the second TRX chain 420 may continue to suspend updating its tracking loops (830).

Once the TX event is completed (as tested at 850), the second TRX chain 420 may then resume updating its tracking loops (860). For example, the TRX circuit 400 may deassert the Skip_RX signal, which returns the ADC 422 and/or the DSP circuit 421 to normal modes of operation. Moreover, because the tracking loops in the second TRX chain 420 may remain unaffected by the TX data signals that were concurrently transmitted by the first TRX chain 410, the tracking loops may quickly lock back onto the phase and/or frequency of the RX data signals once updating is resumed (e.g., because the tracking loops were not adversely affected by outgoing data transmissions).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples. It will, however, be evident that various modifications and changes may be made thereto without departing from the broader scope of the disclosure as set forth in the appended claims. For example, the method steps depicted in the flow charts of FIGS. 7 and 8 may be performed in other suitable orders, multiple steps may be combined into a single step, and/or some steps may be omitted (or further steps included). The specification and drawings are, accordingly, to be regarded in an illustrative sense rather than a restrictive sense.

What is claimed is:

1. A method of wireless communications, the method being implemented by a wireless device and comprising:
   receiving from a first device communicating with the wireless device a first data signal via a first transceiver chain of the wireless device during a single-band simultaneous mode;
   initiating a transmission of a second data signal to a second device via a second transceiver chain of the wireless device while concurrently receiving from the first device the first data signal via the first transceiver chain, wherein each of the first transceiver chain and the second transceiver chain is able to transmit and receive;
   detecting initiating the transmission of the second data signal to the second device via the second transceiver chain; and
   suspending updates to one or more tracking loops of the first transceiver chain in response to detecting initiating the transmission of the second data signal to the second device via the second transceiver chain, wherein the one or more tracking loops are to recover data from the received first data signal.

2. The method of claim 1, wherein the updates to the one or more tracking loops are suspended prior to transmitting the second data signal from the second transceiver chain.

3. The method of claim 1, wherein the updates to the one or more tracking loops are based at least in part on the received first data signal.

4. The method of claim 1, wherein the one or more tracking loops include at least one from the group consisting of a delay-locked loop (DLL) and a phase-locked loop (PLL).

5. The method of claim 1, further comprising:
   resuming updates to the one or more tracking loops of the first transceiver chain after completion of the transmission of the second data signal.

6. The method of claim 1, wherein the first data signal is received on a first wireless channel of a frequency band, the second data signal is transmitted on a second wireless channel of the frequency band, and the first wireless channel is different than the second wireless channel.

7. The method of claim 1, wherein the first data signal is received in accordance with a first wireless protocol, and the second data signal is transmitted in accordance with a second wireless protocol that is different than the first wireless protocol.

8. The method of claim 1, wherein the first data signal is received from the first device, and wherein the second data signal is transmitted to the second device.

9. A wireless communications device, comprising:
   a first transceiver chain able to transmit and receive;
   a second transceiver chain able to transmit and receive;
   one or more processors; and
   a memory storing instructions that, when executed by the one or more processors, cause the wireless communications device to:
      receive from a first device communicating with the wireless device a first data signal via the first transceiver chain during a single-band simultaneous mode;
      initiate a transmission of a second data signal to a second device via the second transceiver chain while concurrently receiving from the first device the first data signal via the first transceiver chain;
      detect initiating the transmission of the second data signal to the second device via the second transceiver chain; and
   suspend updates to one or more tracking loops of the first transceiver chain in response to detecting initiating the transmission of the second data signal to the second device via the second transceiver chain, wherein the one or more tracking loops are to recover data from the received first data signal.

10. The wireless communications device of claim 9, wherein the updates to the one or more tracking loops are suspended prior to transmitting the second data signal from the second transceiver chain.

11. The wireless communications device of claim 9, wherein the updates to the one or more tracking loops are based at least in part on the received first data signal.

12. The wireless communications device of claim 9, wherein the one or more tracking loops include at least one from the group consisting of a delay-locked loop (DLL) and a phase-locked loop (PLL).

13. The wireless communications device of claim 9, wherein execution of the instructions further causes the wireless communications device to:
   resume updates to the one or more tracking loops of the first transceiver chain after completion of the transmission of the second data signal.

14. The wireless communications device of claim 9, wherein the first data signal is received on a first wireless channel of a frequency band, the second data signal is transmitted on a second wireless channel of the frequency band, and the first wireless channel is different than the second wireless channel.

15. The wireless communications device of claim 9, wherein the first transceiver chain resides on a first integrated circuit (IC) die, and wherein the second transceiver chain resides on a second IC die that is different than the first IC die.

16. A non-transitory computer-readable storage medium containing program instructions that, when executed by a processor of a wireless communications device, cause the wireless communications device to:
receive from a first device communicating with the wireless device a first data signal via a first transceiver chain of the wireless communications device during a single-band simultaneous mode;
initiate a transmission of a second data signal to a second device via a second transceiver chain of the wireless communications device while concurrently receiving from the first device the first data signal via the first transceiver chain, wherein each of the first transceiver chain and the second transceiver chain is able to transmit and receive;
detect initiating the transmission of the second data signal to the second device via the second transceiver chain; and
suspend updates to one or more tracking loops of the first transceiver chain in response to detecting initiating the transmission of the second data signal to the second device via the second transceiver chain, wherein the one or more tracking loops are to recover data from the received first data signal.

17. The non-transitory computer-readable storage medium of claim 16, wherein the updates to the one or more tracking loops are suspended prior to transmitting the second data signal from the second transceiver chain.

18. The non-transitory computer-readable storage medium of claim 16, wherein the updates to the one or more tracking loops are based at least in part on the received first data signal.

19. The non-transitory computer-readable storage medium of claim 16, wherein the one or more tracking loops include at least one from the group consisting of a delay-locked loop (DLL) and a phase-locked loop (PLL).

20. The non-transitory computer-readable storage medium of claim 16, wherein execution of the instructions causes the wireless communications device to:
resume updates to the one or more tracking loops of the first transceiver chain after completion of the transmission of the second data signal.

21. The non-transitory computer-readable storage medium of claim 16, wherein the first data signal is received on a first wireless channel of a frequency band, the second data signal is transmitted on a second wireless channel of the frequency band, and the first wireless channel is different than the second wireless channel.

22. The non-transitory computer-readable storage medium of claim 16, wherein the first data signal is received in accordance with a first wireless protocol, and the second data signal is transmitted in accordance with a second wireless protocol that is different than the first wireless protocol.

23. A wireless communications device comprising:
means for receiving from a first device communicating with the wireless device a first data signal via a first transceiver chain of the wireless communications device during a single-band simultaneous mode;
means for initiating a transmission of a second data signal to a second device via a second transceiver chain of the wireless communications device while concurrently receiving from the first device the first data signal via the first transceiver chain, wherein each of the first transceiver chain and the second transceiver chain is able to transmit and receive;
means for detecting initiating the transmission of the second data signal to the second device via the second transceiver chain; and
means for suspending updates to one or more tracking loops of the first transceiver chain in response to detecting initiating the transmission of the second data signal to the second device via the second transceiver chain, wherein the one or more tracking loops are to recover data from the received first data signal.

24. The wireless communications device of claim 23, wherein the updates to the one or more tracking loops are suspended prior to transmitting the second data signal from the second transceiver chain.

25. The wireless communications device of claim 23, wherein the updates to the one or more tracking loops are based at least in part on the received first data signal.

26. The wireless communications device of claim 23, wherein the one or more tracking loops include at least one from the group consisting of a delay-locked loop (DLL) and a phase-locked loop (PLL).

27. The wireless communications device of claim 23, further comprising:
means for resuming updates to the one or more tracking loops of the first transceiver chain after completing the transmission of the second data signal.

* * * * *